(12) United States Patent
Yamada

(10) Patent No.: US 10,904,407 B2
(45) Date of Patent: Jan. 26, 2021

(54) COMPUTER-READABLE STORAGE MEDIUM AND PRINTING SYSTEM

(71) Applicant: Brother Kogyo Kabushiki Kaisha, Nagoya (JP)

(72) Inventor: Jun Yamada, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/835,768

(22) Filed: Mar. 31, 2020

(65) Prior Publication Data

US 2020/0228677 A1  Jul. 16, 2020

Related U.S. Application Data

(63) Continuation of application No. 16/458,534, filed on Jul. 1, 2019, now Pat. No. 10,638,016, which is a continuation of application No. 16/118,947, filed on Aug. 31, 2018, now Pat. No. 10,341,527.

(30) Foreign Application Priority Data

Aug. 31, 2017 (JP) ................. 2017-167455

(51) Int. Cl.
*H04N 1/327* (2006.01)
*H04N 1/32* (2006.01)

(52) U.S. Cl.
CPC ..... *H04N 1/32797* (2013.01); *H04N 1/32641* (2013.01); *H04N 1/32678* (2013.01)

(58) Field of Classification Search
CPC ........... H04N 1/32797; H04N 1/32678; H04N 1/32641

USPC ...................................................... 358/1.15
See application file for complete search history.

(56) References Cited

U.S. PATENT DOCUMENTS

| 5,937,151 A | 8/1999 | Kadota |
| 6,177,934 B1 | 1/2001 | Sugiura et al. |
| 2005/0117178 A1* | 6/2005 | Atobe ................ H04N 1/00217 358/1.15 |
| 2006/0007444 A1 | 1/2006 | Oon et al. |

(Continued)

FOREIGN PATENT DOCUMENTS

| JP | 2007-074642 A | 3/2007 |
| JP | 2013-197690 A | 9/2013 |

*Primary Examiner* — Allen H Nguyen
(74) *Attorney, Agent, or Firm* — Banner & Witcoff, Ltd.

(57) ABSTRACT

A non-transitory computer readable storage medium storing computer readable instructions that are executable by a computer in an information processing apparatus having a communication interface, through which the information processing apparatus is connected with a printer, is provided. The information processing apparatus has a first channel and a second channel configured to cause the printer to print an image based on image data. The computer readable instructions, when executed by the computer, cause the computer to conduct a first printing control to cause the printer to print the image through the first channel, determine whether image printing to print the image by the printer under the first printing control failed, based on a determination that the image printing under the first printing control failed, conduct a second printing control to cause the printer to retry the image printing based on the image data through the second channel.

8 Claims, 9 Drawing Sheets

(56) References Cited

U.S. PATENT DOCUMENTS

| | | |
|---|---|---|
| 2006/0077444 A1 | 4/2006 | Lum et al. |
| 2008/0080007 A1* | 4/2008 | Ueno ............... G06K 15/12 358/1.18 |
| 2009/0002730 A1 | 1/2009 | Yamada et al. |
| 2011/0317218 A1 | 12/2011 | Zhang et al. |
| 2012/0062915 A1 | 3/2012 | Hirama |
| 2012/0307263 A1* | 12/2012 | Ichikawa ........... G06K 15/1806 358/1.8 |
| 2014/0092410 A1 | 4/2014 | Taima et al. |
| 2014/0355060 A1 | 12/2014 | Kamoi |
| 2016/0063366 A1 | 3/2016 | Harano |
| 2016/0171351 A1 | 6/2016 | Scillieri et al. |

* cited by examiner

COMPUTER-READABLE STORAGE MEDIUM AND PRINTING SYSTEM

CROSS REFERENCE TO RELATED APPLICATION

This application is a continuation of U.S. patent application Ser. No. 16/458,534 filed Jul. 1, 2019 which is a continuation of U.S. patent application Ser. No. 16/118,947 filed Aug. 31, 2018, issued as U.S. Pat. No. 10,341,527 on Jul. 2, 2019 which claims priority from Japanese Patent Application No. 2017-167455, filed on Aug. 31, 2017, the entire subject matter of which are incorporated herein by reference.

BACKGROUND

Technical Field

An aspect of the present disclosure is related to a printing system and a computer-readable storage medium storing a program to be run in an information processing apparatus, which is capable of communicating with a printer. Specifically, the present disclosure is related to a technic to switch communication channels for processing image data between the printer and the information processing apparatus.

Related Art

An information processing apparatus may communicate with a device, e.g., a printer, through one of a plurality of available communication channels to exchange data to be processed. The communication channels to transfer the data from the information processing apparatus to the device may be switched from one to another. For example, a Passive Optical Network (PON) system, having a plurality of Optical Network Units (ONUs) and Optical Line Terminals (OLTs) each connected with one of the ONUs, is known. Each ONU may have a plurality of PON interfaces, which connect the ONU with the OLT through different communication channels, and the OLT may switch the communication channels based on parameters that indicate communication qualities of the communication channels.

SUMMARY

In recent years, information processing apparatuses having a so-called driverless printing function, such as AirPrint (registered trademark), which enables image printing in conformity with a predetermined printing standard without using a printer driver, have been introduced. The information processing apparatus may transfer image data for an image to be printed to a printer in conformity with a predetermined printing standard using a basic print controlling function provided by Operating System (OS). The printer receiving the image data may print an image based on the image data according to a program installed in the printer in conformity with a predetermined printing standard.

The basic print controlling function usable as above may provide fewer or less complicated print setting options to a user, and a level of printing quality available from the basic print controlling function may not be satisfactory to the user. In order to overcome the insufficiency, more advanced or detailed print setting options may be achieved through a specialized print controlling function applicable to a specific printer, which may be obtained separately from the OS and applied to the printer. The information processing apparatus equipped with the specialized print controlling function may process the image data for the image to be printed by a program specifically designed for the printer. Meanwhile, the printer may print an image based on the image data processed by the specifically designed program. The information processing apparatus equipped with the different print controlling programs may have a plurality of processing channels to process the image data between the information processing apparatus and the printer, even when the information processing apparatus and the printer are connected with each other through a single communication interface.

While the information processing apparatus may have the plurality of processing channels to process the image data, the program among the plurality of programs to process the image may depend on the processing channel to be used. Therefore, for example, while image processing by one of the programs may result in an error, another one of the programs may process the image data without the error. In this regard, selecting a preferable program to process the image data may help avoiding the error and enable the image to be printed without failure. However, selecting the preferable program among a plurality of programs may be difficult to some users or cause load on the users.

The present disclosure is advantageous in that a printing system, having a printer and an information processing apparatus connected with each other through a plurality of processing channels there-between, by which a user may achieve a printed material with a reduced load, is provided.

According to an aspect of the present disclosure, a non-transitory computer readable storage medium storing computer readable instructions that are executable by a computer in an information processing apparatus having a communication interface, through which the information processing apparatus is connected with a printer, is provided. The information processing apparatus has a first channel and a second channel being processing channels configured to cause the printer to print an image based on image data. The computer readable instructions, when executed by the computer, cause the computer to, in response to receiving a print command, conduct a first printing control to cause the printer to print the image through the first channel, determine whether image printing to print the image by the printer under the first printing control failed, and based on a determination that the image printing under the first printing control failed, conduct a second printing control to cause the printer to retry the image printing based on the image data through the second channel.

According to another aspect of the present disclosure, a printing system having an information processing apparatus and a printer, which are configured to communicate with each other in conformity with a predetermined communication protocol, is provided. The printing system has processing channels configured to cause the printer to print an image based on image data. The processing channels includes a first channel configured to cause the information processing apparatus to conduct a first rasterization process to generate first rasterized data, and cause the printer to receive the first rasterized data and print an image based on the first rasterized data, and a second channel configured to cause the printer to conduct a second rasterization process to generate second rasterized data and print the image based on the second rasterized data. The information processing apparatus is configured to, in response to receiving a print command, conduct a first printing control to cause the printer to print the image through the first channel, determine whether image printing to print the image by the printer under the first printing control failed, and based on a determination that the image printing under the first printing control failed, conduct a second printing control to cause the printer to retry the image printing based on the image data through the second channel.

BRIEF DESCRIPTION OF THE ACCOMPANYING DRAWINGS

DETAILED DESCRIPTION

Hereinafter, with reference to the accompanying drawings, described below will be a printing system 100 as an embodiment of the present disclosure.

Figure 1:
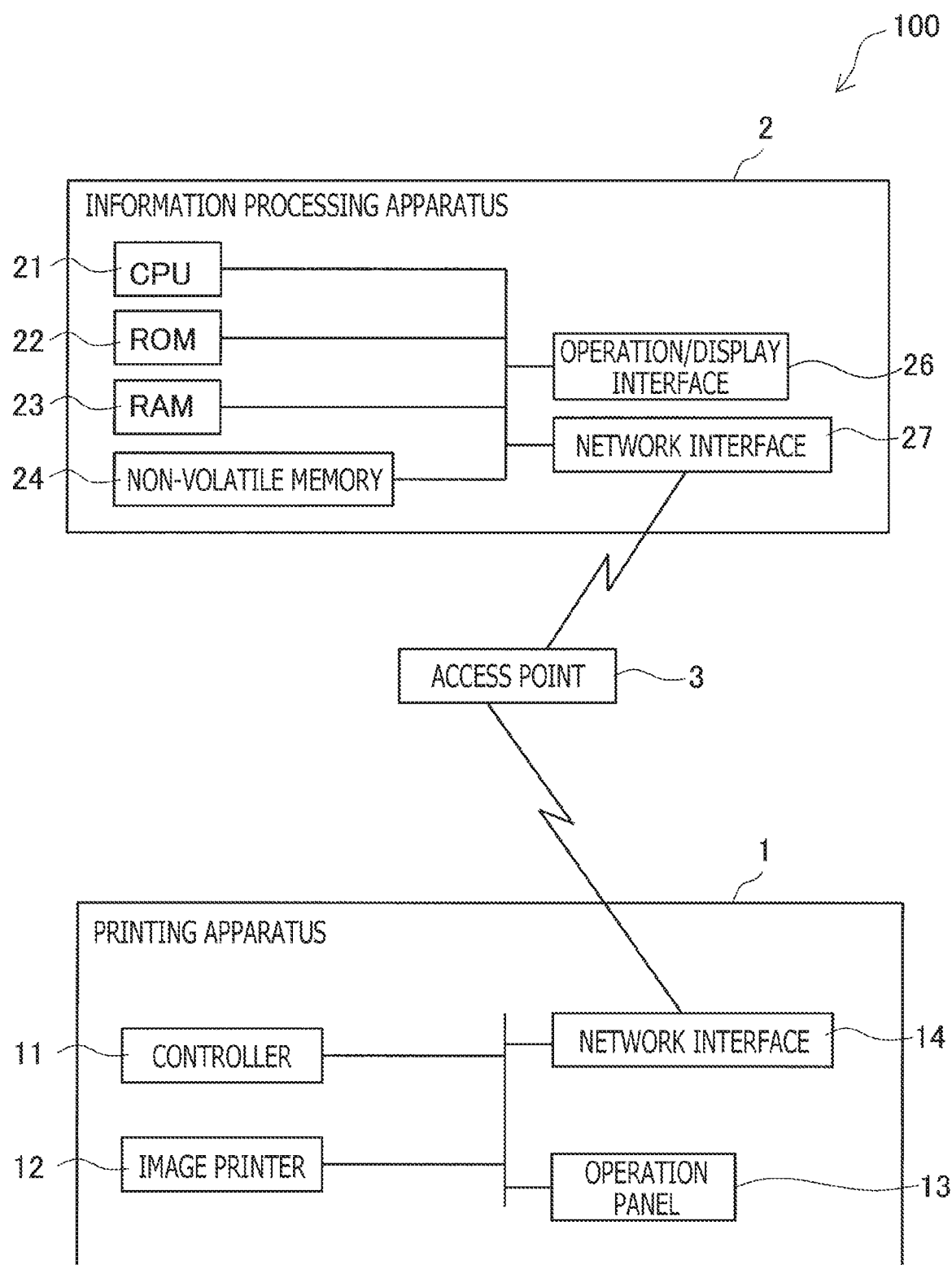
FIG. 1 is a block diagram to illustrate a printing system according to an embodiment of the present disclosure.

The printing system 100 according to the embodiment includes, as shown in FIG. 1, a printing apparatus 1 and an information processing apparatus 2 that may communicate with each other. The printing apparatus 1 may print an image on a printable medium and may include, for example, a label printer, a page printer, a copier, and a multifunction peripheral device. The information processing apparatus 2 may generate and edit image data for the image to be printed in the printing apparatus 1, and transmit a print execution command and the image data to the printing apparatus 1. The information processing apparatus 2 may include, for example, a smartphone, a personal computer, and a tablet computer. The printing apparatus 1 and the information processing apparatus 2 in the printing system 100 may not necessarily be limited to a single printing apparatus 1 and a single information processing apparatus 2, respectively, but may include a plurality of printing apparatuses 1 and a plurality of information processing apparatuses 2, respectively.

The printing apparatus 1 includes, as shown in FIG. 1, a controller 11, an image printer 12, an operation panel 13, and a network interface 14. The controller 11 includes a CPU and a memory and may control devices and parts in the printing apparatus 1. The controller 11 drawn as a single piece of hardware controller in FIG. 1 may not necessarily be limited to a single piece of hardware controller but may include a plurality of hardware devices that may collectively control the printing apparatus 1.

The image printer 12 may print an image on a printable medium in an image forming technic, which may be, for example, an electro-photographic technic or an inkjet printing technic. The printing apparatus 1 may be capable of printing either colored images or monochrome images. The operation panel 13 may include, for example, a touch panel, which may accept a user's input and display information. The operation panel 13 may include indicator lamps and buttons. The network interface 14 is a hardware device to establish communication with the information processing apparatus 2.

The information processing apparatus 2 includes, as shown in FIG. 1, a CPU 21, a ROM 22, a RAM 23, a non-volatile memory 24, an operation/display interface 26, and a network interface 27. The ROM 22 may store programs including an activation program to activate the information processing apparatus 2. The RAM 23 may be used as a work area for processing data and as a temporary memory area to store data temporarily. The non-volatile memory 24 may be, for example, an HDD and a flash memory, and store programs and data therein.

The CPU 21 may process information according to programs read from the ROM 22 and the non-volatile memory 24. The operation/display interface 26 may include, for example, a touch panel, which may accept a user's input and display information. The operation/display interface 26 may include, for example, a keyboard, a mouse, and a display. The network interface 27 is a hardware device to establish communication with the printing apparatus 1.

In the printing system 100, the information processing apparatus 2 and the printing apparatus 1 may communicate with each other wirelessly in conformity with Wi-Fi (registered trademark) standard through a common access point 3. In this regard, the network interfaces 14, 27 are interfaces that enable wireless communication in conformity with the Wi-Fi standard, more specifically, with IEEE 802.11 standard or other standards in compliance with IEEE 802.11. However, the technology to establish wireless communication between the information processing apparatus 2 and the printing apparatus 1 may not necessarily be limited to the Wi-Fi standard. For example, the information processing apparatus 2 and the printing apparatus 1 may wirelessly communicate with each other through direct connection without communicating through the access point 3.

Figure 2:
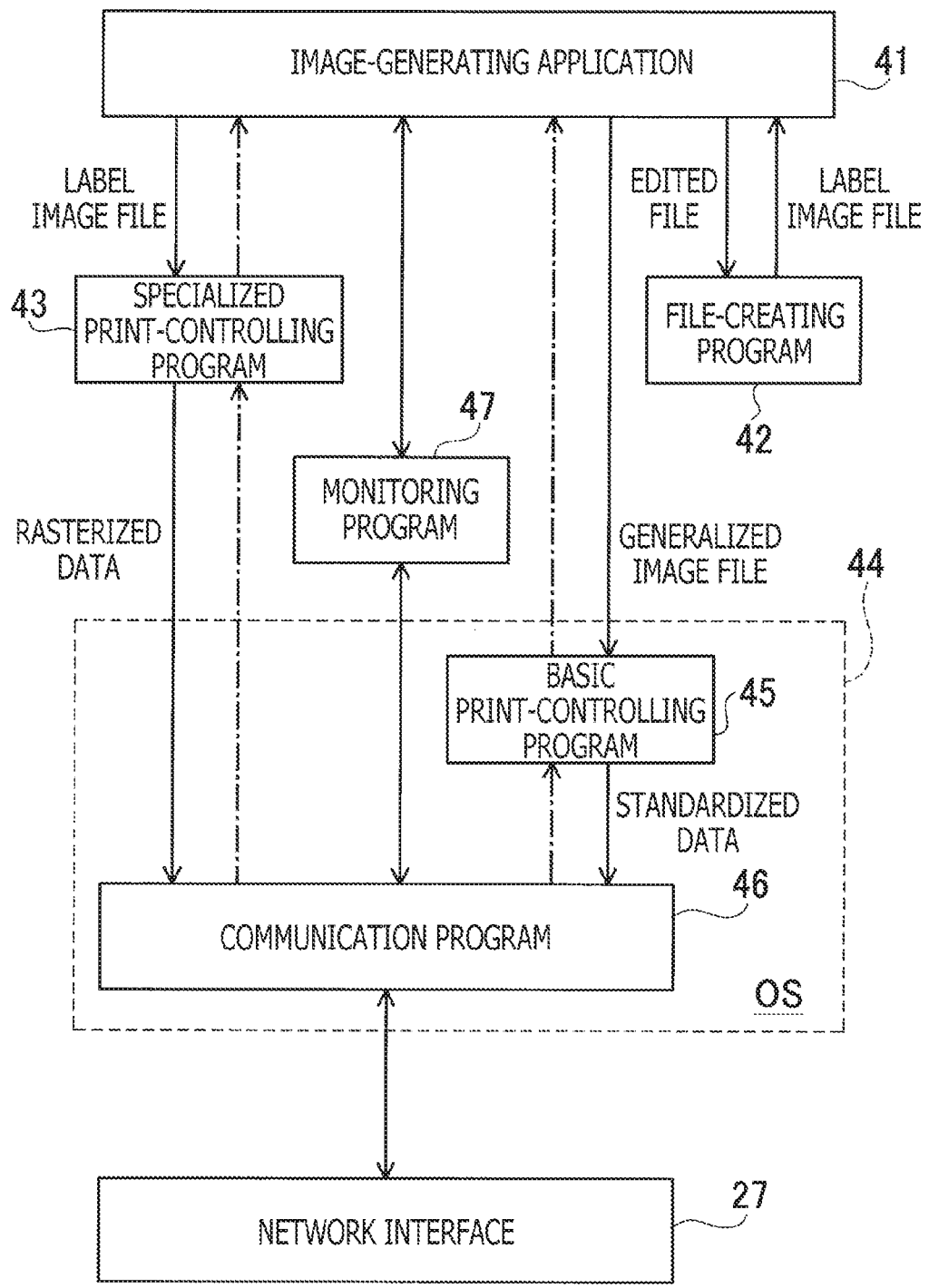
FIG. 2 is a block diagram to illustrate printing programs in an information processing apparatus in the printing system according to the embodiment of the present disclosure.

The non-volatile memory 24 in the information processing apparatus 2 stores, as shown in FIG. 2, an image-generating application 41 being an application program for generating images, a file-creating program 42, a specialized print-controlling program 43, an operating system (OS) 44. The OS 44 for the information processing apparatus 2 includes a basic print-controlling program 45 and a communication program 46. In the following paragraphs, an application program may be referred to as an application. In FIG. 2, directions of data flows from one program to another program are indicated by solid arrows.

The image-generating application 41 is a program having functions to, for example, accept commands from a user, display an image, and edit and save the image. The commands from the user to be accepted by the image-generating application 41 may include, for example, a command to start image printing and a command to designate a print setting. The image-generating application 41 may, for example, generate and edit a label image file to be used in a label printer. The label image file may be a data file to print an image on a label medium, which may be a strip of tape.

The file-creating program 42 is a program having a function to create an image file for an image to be printed. The file-creating program 42 in the information processing apparatus 2 may, for example, create the label image file according to a command accepted by the image-generating application 41. A procedure for the image-generating application 41 to generate the label image file may include, for example, outputting a command to the file-creating program 42 to create a label image file and receiving the created label image file from the file-creating program 42.

The specialized print-controlling program 43 is a program having functions to, for example, generate rasterized data, by rasterizing image data contained in the label image file, and control the communication program 46 to transmit the generated rasterized data to the printing apparatus 1. The specialized print-controlling program 43 may be designed to specifically control a printing apparatus in a specific model. Therefore, the specialized print-controlling program 43 may not control a printing apparatus in a different model from, for example, a different manufacturer. The specialized print-controlling program 43 is a specialized program to control the printing apparatus 1 and may cope with more advanced or detailed print settings, which are applicable to image processing for printing the image in the printing apparatus 1. The specialized print-controlling program 43 may generate rasterized data in a format, which is feasible to the printing apparatus 1.

The basic print-controlling program 45 is a program having functions to generate standardized data for printing in conformity with a predetermined printing standard and control the communication program 46 to transmit the generated standardized data to the printing apparatus 1. The basic print-controlling program 45 is a basic program provided by the OS 44. The standardized data transmitted by the basic print-controlling program 45 may be data in conformity with a general rasterization standard, which is feasible to the printing apparatus 1, and is not rasterized.

The basic print-controlling program 45 is a general program designed to run on a variety of printing apparatuses that support a predetermined printing standard. In other words, as long as the printing apparatus has a functionality to cope with the basic print-controlling program 45, the printing apparatus may print an image by the standardized data regardless of a model or a manufacturer of the printing apparatus. Meanwhile, due to the versatility of the basic print-controlling program 45 to cope with the variety of printing apparatuses, print setting options applicable through the basic print-controlling program 45 may be limited to basic settings. Therefore, the basic print-controlling program 45 may not always accept the print setting options that are feasible to the printing apparatus 1. Printing systems utilizing the basic print-controlling program 45 may include, for example, AirPrint (registered trademark) and Mopria (registered trademark).

In this regard, the label image file mentioned earlier may be more preferably processed by the specialized print-controlling program 43. The image-generating application 41 may transfer image data of an image to be printed to either the specialized print-controlling program 43 or the basic print-controlling program 45. When the image data is transferred to the specialized print-controlling program 43, the image-generating application 41 may transfer the label image file and apply all of the commanded print setting options to the label image data. Meanwhile, when the image data is transferred to the basic print-controlling program 45, the image-generating application 41 may transfer a data file, in which the label image file is converted into a generally usable format, to the basic print-controlling program 45, with merely the basic print setting options applied thereto.

The communication program 46 is a program having a function to control the network interface 27 to communicate with another communication device. For example, the specialized print-controlling program 43 may register the generated rasterized data in a spooler in the OS 44. The communication program 46 in the information processing apparatus 2 may transmit the data registered in the spooler to the printing apparatus 1 through the network interface 27. The communication program 46 is another one of basic programs provided by the OS 44. A part of the communication program 46 may be stored in the ROM 22.

The information processing apparatus 2 further includes, as shown in FIG. 2, a monitoring program 47, which may monitor statuses in the printing apparatus 1 connected thereto through the network interface 27. The monitoring program 47 may, for example, obtain status information concerning the printing apparatus 1 periodically from the printing apparatus 1 and store latest status information in a memory. The status information may indicate, for example, ready, printing in progress, and error statuses in the printing apparatus 1. The information indicating the error status may further include information concerning a cause of the error, which may be, for example, sheet jam, sheet running out, or ink running out.

The image-generating application 41 may query the monitoring program 47 about the status of the printing apparatus 1 in order to obtain the status information of the printing apparatus 1. The image-generating application 41 may, further, receive a print completion report from the printing apparatus 1 through the specialized print-controlling program 43 and the basic print-controlling program 45, as indicated by dash-and-dot lines in FIG. 2.

Figure 3:
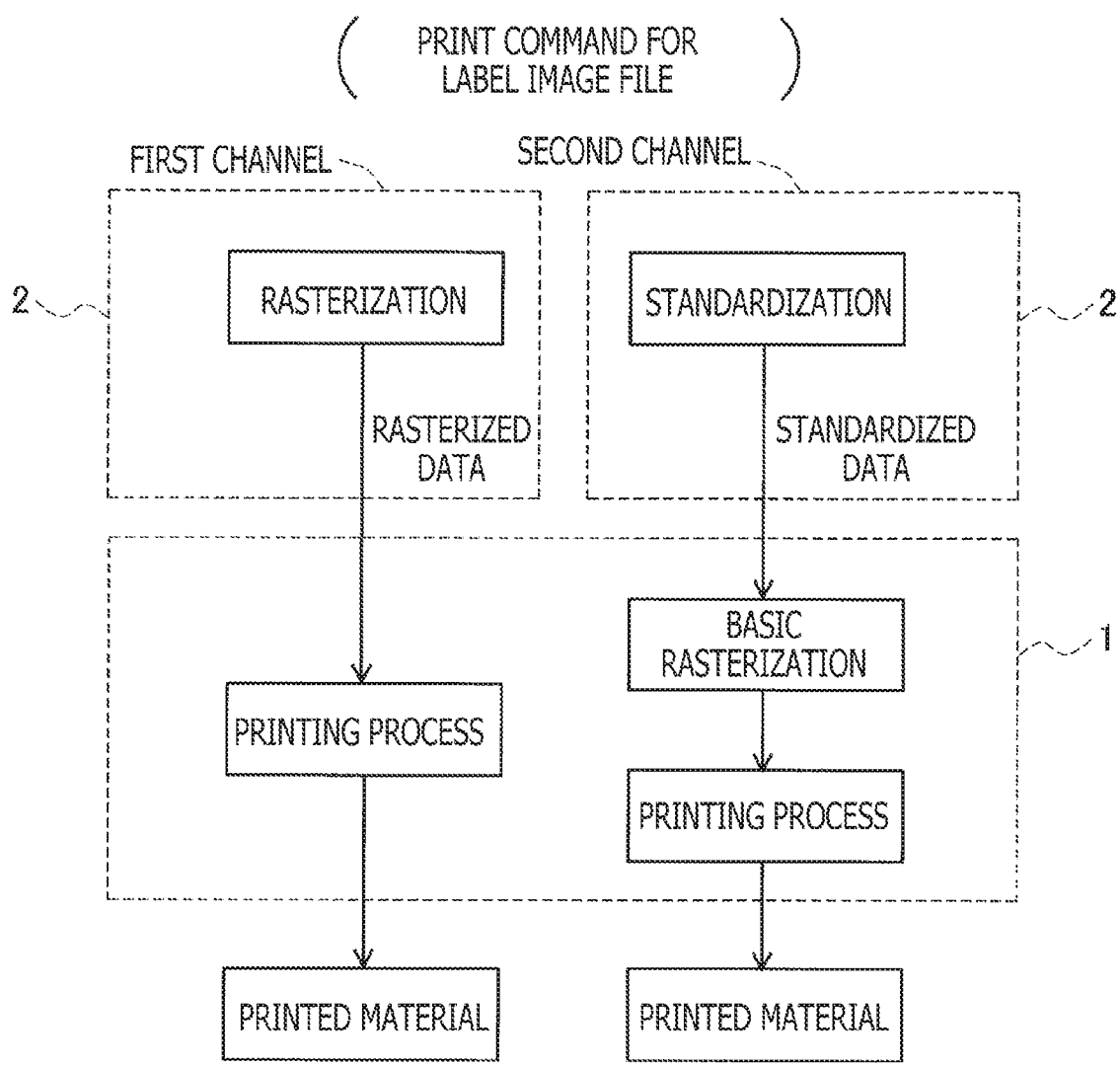
FIG. 3 is a block diagram to illustrate processing channels for the information processing apparatus in the printing system according to the embodiment of the present disclosure.

The printing system 100 may have, as indicated in FIG. 3, two (2) processing channels to cause the printing apparatus 1 to print an image. The processing channels include a first channel, in which the information processing apparatus 2 may rasterize the image data, and a second channel, in which the printing apparatus 1 may rasterize the image data.

In order to control the printing apparatus 1 to print the image through the first channel, the information processing apparatus 2 may, as shown in FIG. 3, rasterize the image data contained in the label image file in a rasterization process and transmit the rasterized data to the printing apparatus 1. The printing apparatus 1 may receive the rasterized data and print the image based on the rasterized data having been received. Through the first channel, the information processing apparatus 2 rasterizes the image data for the image to be printed by the specialized print-controlling program 43 shown in FIG. 2.

Through the first channel, the data is processed by the specialized print-controlling program 43, which is feasible to the print settings that are applicable to the printing apparatus 1. While the specialized print-controlling program 43 is not provided by the OS 44, in order to print the image through the first channel, the information processing apparatus 2 may not use print-controlling functions (e.g., the basic print-controlling program 45) contained in the OS 44.

In order to control the printing apparatus 1 to print the image through the second channel, the information processing apparatus 2 may, as shown in FIG. 3, standardize the image data contained in the label image file in a standardization process and transmit the standardized data to the printing apparatus 1. The printing apparatus 1 may receive the standardized data, rasterize the standardized data in a general rasterization process, and print an image based on the rasterized data having been rasterized. Through the second channel, the information processing apparatus 2 standardizes the image data of the image to be printed by the basic print-controlling program 45 shown in FIG. 2.

Through the second channel, the data is processed by the basic print-controlling program 45, which is the print-controlling function included in the OS 44. In this regard, some of the print settings applicable to the printing apparatus 1 may not be feasible to the basic print-controlling program 45. For example, the basic print-controlling program 45 may not be adapted to handle image data in a high resolution, which may only be adaptable to a specific model of printing apparatus. Therefore, in order to print the image through the second channel, a resolution adaptable to majority of models, i.e., a print setting other than the high resolution, may be applied.

Thus, the first channel and the second channel differ in the subjects to process the image data of the image to be printed. Namely, through the first channel, it is the information processing apparatus 2 that rasterizes the image data. On the other hand, through the second channel, it is the printing apparatus 1 that rasterizes the image data. In other words, the first channel is a channel, in which the information processing apparatus 2 rasterizes the image data, and the second channel is a channel, in which the printing apparatus 1 rasterizes the image data. Further, the first channel and the second channel may differ in algorisms to rasterize the image data and in outcomes of the rasterization. In other words, in the first channel, more advanced or detailed print settings may be applicable to the rasterization, while in the second channel some of the print settings may be limited in the rasterization. Furthermore, the first channel and the second channel may differ in types, formats, and volumes of the data to be transmitted from the information processing apparatus 2 to the printing apparatus 1. Therefore, for example, some of the label image files may be difficult to be processed in one of the first channel and the second channel but may be easily processed in the other of the first channel and the second channel.

In the present embodiment, the printing apparatus 1 in the printing system 100 is adapted to print both an image based on the rasterized data transmitted through the first channel and an image based on the standardized data transmitted through the second channel. Meanwhile, the information processing apparatus 2 is adapted to transmit data to the printing apparatus 1 through either the first channel or the second channel by the wireless communication through the network interface 27. Therefore, the printing system 100 is adapted to process image data through both the first channel and the second channel.

Meanwhile, in the image-generating application 41, a channel to be prioritized between the first channel and the second channel to process the image data at current moment is set as a priority channel and stored in the non-volatile memory 24. The information processing apparatus 2 in the printing system 100 receiving a command to cause the printing apparatus 1 to print an image through the image-generating application 41 may attempt printing control firstly through the channel set as the priority channel. For example, the first channel may be set as the priority channel at the current moment. If the printing control through the first channel is determined to have failed, the information processing apparatus 2 may secondly attempt printing control to print the image for the same image data through the second channel. The priority channel may be initially set to, for example, the first channel but may be changed by the user's operation. For another example, a plurality of printing apparatuses 1 may be connected with the information processing apparatus 2, and the priority channel between the information processing apparatus 2 and each printing apparatus 1 may be set individually.

For example, when the first channel is set as the priority channel, the information processing apparatus 2 may attempt printing control through the first channel, but the printing control may not be completed due to, for example, an error during an imaging process with the image data, communication timeout during the transmission of the rasterized data to the printing apparatus 1, etc. If the printing control with the printing apparatus 1 stays incomplete, the information processing apparatus 2 may determine that the printing control through the first channel failed. The imaging process with the image data may include, for example, rasterization by the specialized print-controlling program 43 and editing an image.

Moreover, the information processing apparatus 2 may determine that the printing control through the currently selected channel failed when the status information obtained through the monitoring program 47 indicates an erroneous state in the printing apparatus 1. For example, in the printing control through the second channel, the printing apparatus 1 may conduct the basic rasterization, and if an error occurs during the basic rasterization process, the printing apparatus 1 may shift to the erroneous state. For another example, if the printing apparatus 1 runs out of consumable items such as sheets and ink, the printing apparatus 1 may shift to the erroneous state. The information processing apparatus 2 may determine that the printing control failed when the status information indicating the erroneous state in the printing apparatus 1 or when information indicating an error in the printing apparatus 1 is received from the printing apparatus 1.

Figure 4:
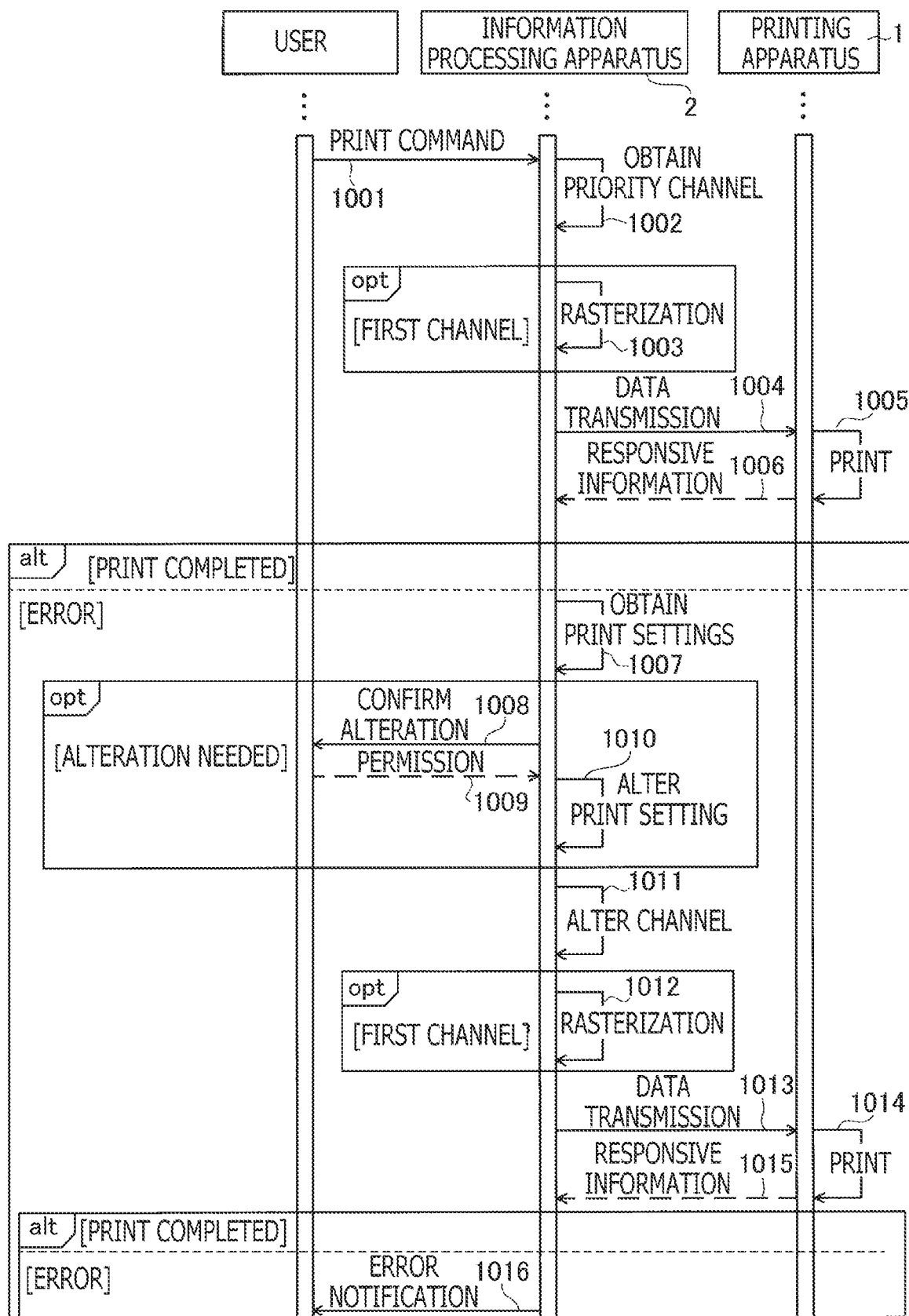
FIG. 4 is a sequence chart to illustrate a sequence of interactions to switch processing channels in the printing system according to the embodiment of the present disclosure.

In the following paragraphs, with reference to FIG. 4, described briefly will be a procedure to switch channels and conduct the printing control.

In 1001, the user may first activate the image-generating application 41 in the information processing apparatus 2 and enter a print command to start printing. In response to receiving the print command through the image-generating application 41, in 1002, the information processing apparatus 2 may obtain the priority channel. The sequence of actions in the information processing apparatus 2 as shown in FIG. 4 may all be conducted by the functions in the image-generating application 41. If the priority channel is the first channel, in 1003, the information processing apparatus 2 may rasterize the image data. In 1004, the information processing apparatus 2 may transmit the data for printing to the printing apparatus 1.

In 1005, the printing apparatus 1 may print an image based on the data received in 1004. If the priority channel is the second channel, the printing apparatus 1 may rasterize the received data and print an image based on the rasterized data. In 1006, the information processing apparatus 2 may receive responsive information, which indicates successful completion or erroneous incompletion of the image printing. If the responsive information indicates successful completion, the procedure in the printing system 100 ends thereat.

If the responsive information indicates an error, in 1007, the information processing apparatus 2 may obtain print settings applied to the image printing. Some of the print settings may be feasible to one of the first channel and the second channel but may be infeasible to the other of the first channel and the second channel. Therefore, if the print settings contain such a print setting that is feasible to solely one of the channels, such a print setting may need to be altered.

If the print setting needs to be altered, in 1108, the information processing apparatus 2 may display a message to ask the user whether the alteration may be permitted. In 1009, if the user's reply indicates permission for the alteration of the print setting, in 1010, the information processing apparatus 2 may alter the print setting. If the user's reply indicates denial to the alteration, the information processing apparatus 2 may neither alter the print setting nor retry the image printing.

In 1011, in order to retry the image printing, the information processing apparatus 2 may alter the channel. If the channel after the alteration is the first channel, in 1012, the information processing apparatus 2 may rasterize the image data. In 1013, the information processing apparatus 2 may transmit the data for printing to the printing apparatus 1. In 1014, the printing apparatus 1 receiving the data from the information processing apparatus 2 may print an image based on the received data. In 1015, the image-generating application 41 may receive responsive information indicating successful completion or erroneous incompletion of the image printing.

If the responsive information indicates successful completion, the procedure in the printing system 100 ends thereat. If the responsive information indicates an error even after the alteration of the channels, in 1016, the image-generating application 41 may inform the user of the error.

Next, in the following paragraphs, with reference to FIG. 5, described will be a flow of steps in a printing process to be conducted by the information processing apparatus 2 in order to interact with the printing apparatus 1 and the user as described above. The printing process may be executed by the CPU 21 in the information processing apparatus 2 in response to the print command through the active image-generating application 41. In the printing process, the priority channel may be initially set to the first channel.

As the printing process starts, in S101, the CPU 21 obtains the priority channel stored in the non-volatile memory 24. In S102, the CPU 21 determines whether the priority channel is the first channel. If the priority channel is the first channel (S102: YES), in S103, the CPU 21 conducts a first-channel printing process, in which the image printing is conducted through the first channel.

Figure 6:
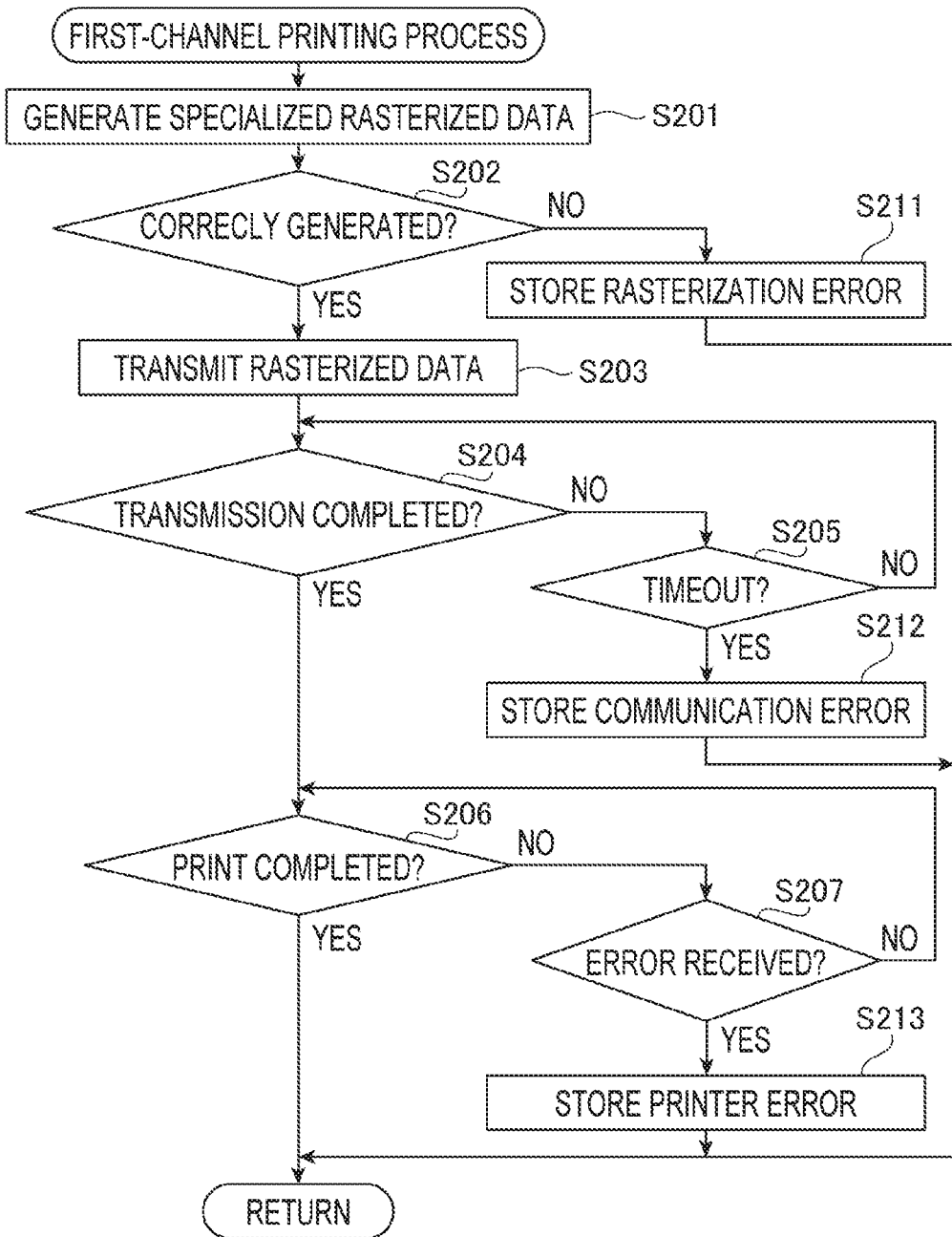
FIG. 6 is a flowchart to illustrate flows of steps in a first-channel printing process in the information processing apparatus according to the embodiment of the present disclosure.

A flow of steps in the first-channel printing process will be described below with reference to FIG. 6. As the first-channel printing process starts, in S201, the CPU 21 generates rasterized data for the image data designated as a printing object. In particular, the CPU 21 rasterizes the image data in the specialized print-controlling program 43. Prior to the rasterization, the image may be edited in an editing process, for example, by resizing, color replacement, and resolution change. If the image requires the editing process, the CPU 21 may edit and thereafter rasterize the image data in S201.

In S202, the CPU 21 determines whether the rasterized data is correctly generated. If the CPU 21 determines that the rasterized data is correctly generated (S202: YES), in S203, the CPU 21 controls the network interface 27 to transmit the generated rasterized data to the printing apparatus 1. In S204, the CPU 21 determines whether transmission of the rasterized data is completed.

In S204, if the CPU 21 determines that transmission is not completed (S204: NO), in S205, the CPU 21 determines whether the communication with the printing apparatus 1 timed out. If the CPU 21 determines that the communication has not timed out (S205: NO), the CPU 21 returns to S204 and waits until the transmission of the rasterized data is completed or the communication times out.

In S204, if the CPU 21 determines that transmission is completed (S204: YES), in S206, the CPU 21 determines whether the information processing apparatus 2 received responsive information indicating completion of the image printing from the printing apparatus 1. Meanwhile, the printing apparatus 1 prints an image based on the rasterized data received from the information processing apparatus 2. When the image printing is completed, the printing apparatus 1 transmits the responsive information indicating the completion of the image printing to the information processing apparatus 2. On the other hand, if the image printing stays incomplete due to an error, the printing apparatus 1 transmits responsive information indicating occurrence of the error to the information processing apparatus 2.

In S206, if the CPU 21 determines that the information processing apparatus 2 received the responsive information indicating completion of the image printing (S206: YES), the CPU 21 exits the first-channel printing process and returns to the printing process (FIG. 5). If the CPU 21 determines that the information processing apparatus 2 has not received the responsive information indicating completion of the image printing (S206: NO), in S207, the CPU 21 determines whether the information processing apparatus 2 received responsive information indicating an error in the printing apparatus 1. If the CPU 21 determines that the information processing apparatus 2 has not received the responsive information indicating an error in the printing apparatus 1 (S207: NO), the CPU 21 returns to S206 and waits until either the responsive information indicating completion of the image printing or the responsive information indicating an error is received.

Meanwhile, in S202, if the CPU 21 determines that the rasterized data is not correctly generated (S202: NO), in S211, the CPU 21 stores error cause information in the non-volatile memory 24. In particular, information indicating a rasterization error is stored in the non-volatile memory 24 as the error cause information. The CPU 21 exits the first-channel printing process.

In S205, if the CPU 21 determines that the communication timed out (S205: YES), in S212, the CPU 21 stores error cause information in the non-volatile memory 24. In particular, information indicating a communication error is stored in the non-volatile memory 24 as the error cause information. The CPU 21 exits the first-channel printing process.

In S207, if the CPU 21 determines that the information processing apparatus 2 has received the responsive information indicating an error in the printing apparatus 1 (S207: YES), the CPU 21 stores error cause information in the non-volatile memory 24. In particular, information indicating a printer error in the printing apparatus 1 is stored in the non-volatile memory 24 as the error cause information. The CPU 21 exits the first-channel printing process.

Figure 5:
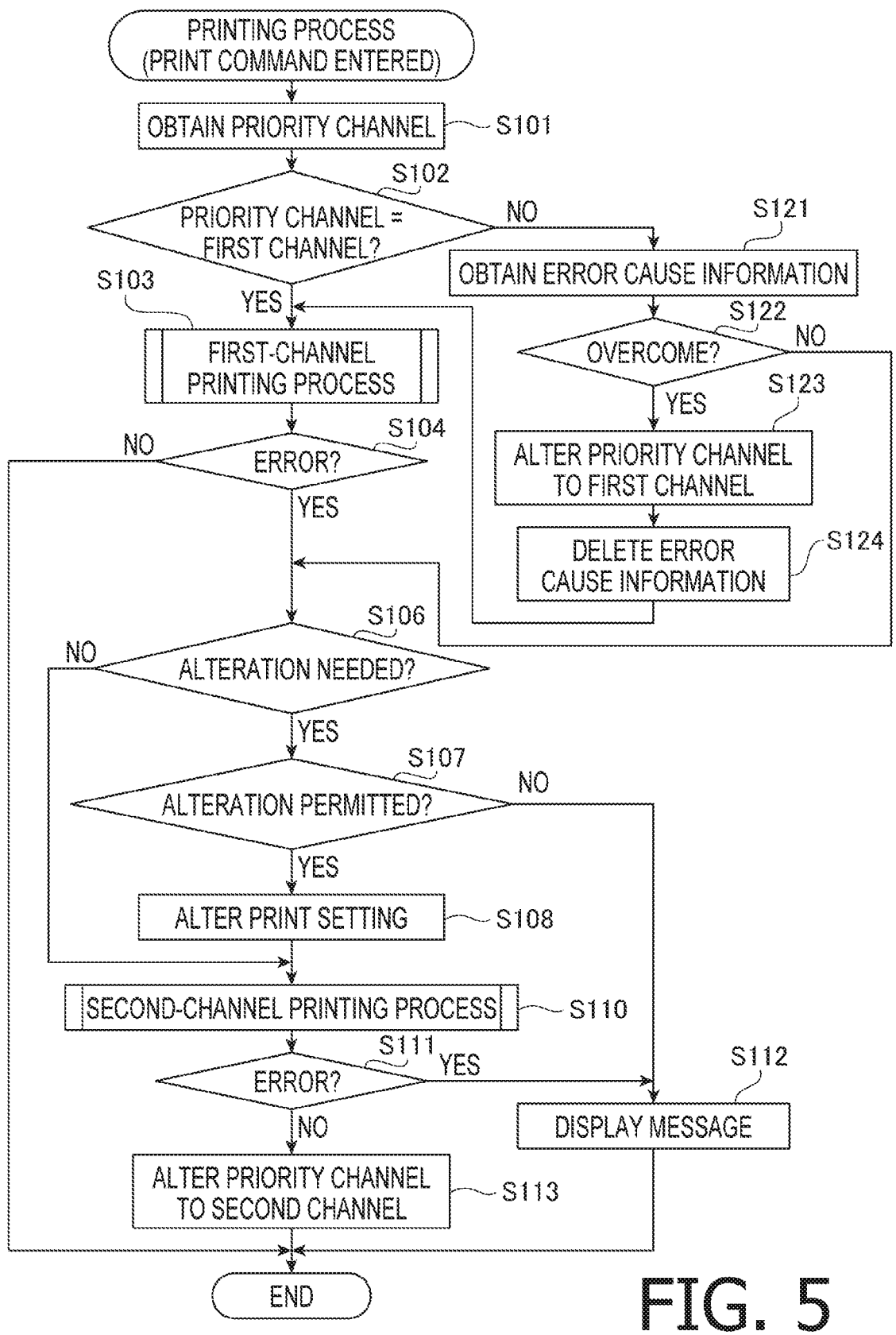
FIG. 5 is a flowchart to illustrate flows of steps in a printing process in the information processing apparatus according to the embodiment of the present disclosure.

The flow returns to the printing process in FIG. 5. Following the first-channel printing process in S103, in S104, the CPU 21 determines whether an error occurred in the first-channel printing process based on the error cause information. If the CPU 21 determines that no error occurred (S104: NO), the CPU 21 ends the printing process thereat.

In S104, if the CPU 21 determines that an error occurred in the first-channel printing process (S104: YES), in S106, the CPU 21 determines whether the print settings should be altered. As mentioned earlier, the first channel and the second channel may differ in the feasible print settings; therefore, a print setting which is feasible to the first channel may not be feasible to the second channel. In this regard, in S106, the CPU 21 determines whether the print settings applied to image printing by the current print command contain a print setting which is not feasible to the second channel.

Figure 7:
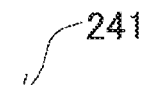
FIG. 7 is a table to illustrate feasibilities of resolutions to the first and second processing channels in the information processing apparatus according to the embodiment of the present disclosure.

In order to determine a print setting infeasible to the second channel, the information processing apparatus 2 may store a feasibility correspondence table 241, as shown in FIG. 7, which indicates feasibilities of the print settings to the first channel and the second channel, in the non-volatile memory 24. For example, print settings such as a high resolution and an ultrahigh resolution may be feasible to the first channel that uses the specialized print-controlling program 43 but may not be feasible to the second channel that uses the basic print-controlling program 45. Therefore, if the print settings contain the print setting of the high resolution or the ultrahigh resolution, in S106, the CPU 21 determines that the print setting should be altered. It may be noted that FIG. 7 only indicates feasibilities of the resolutions to the first channel and the second channel; however, the information processing apparatus 2 may store feasibilities of more print settings to the first channel and the second channel.

In S106, if the CPU 21 determines that a print setting needs to be altered (S106: YES), in S107, the CPU 21 controls the operation/display interface 26 (see FIG. 1) to display, for example, a message to ask the user whether the print setting may be altered and accept the user's reply. For example, the CPU 21 may display a message if the print setting of the high resolution may be altered to a medium resolution in order to accomplish the image printing.

In S107, if the CPU 21 receives a reply from the user indicating that the print setting may be altered (S107: YES), in S108, the CPU 21 alters the printing setting so that the altered print setting should be feasible to the second channel. Following S108, or if the CPU 21 determines that the print setting needs not to be altered in S106 (S106: NO), in S110, the CPU 21 conducts a second-channel printing process.

The printing control through the first channel is feasible to more advanced or detailed print settings that suit with functionalities of the printing apparatus 1. On the other hand, the printing control through the second channel using basic technics may merely be feasible to less complicated print settings. For example, while the printing apparatus 1 may be capable of printing an image in a high resolution, if the printing control is conducted through the second channel, which is not feasible to process the image in the high resolution but is feasible to the medium and low resolutions, the print setting of the resolutions may need to be altered to the medium or low resolution. The print settings may be altered manually by the user or automatically by the CPU 21. Moreover, each of the print settings may be altered individually by the user.

Figure 8:
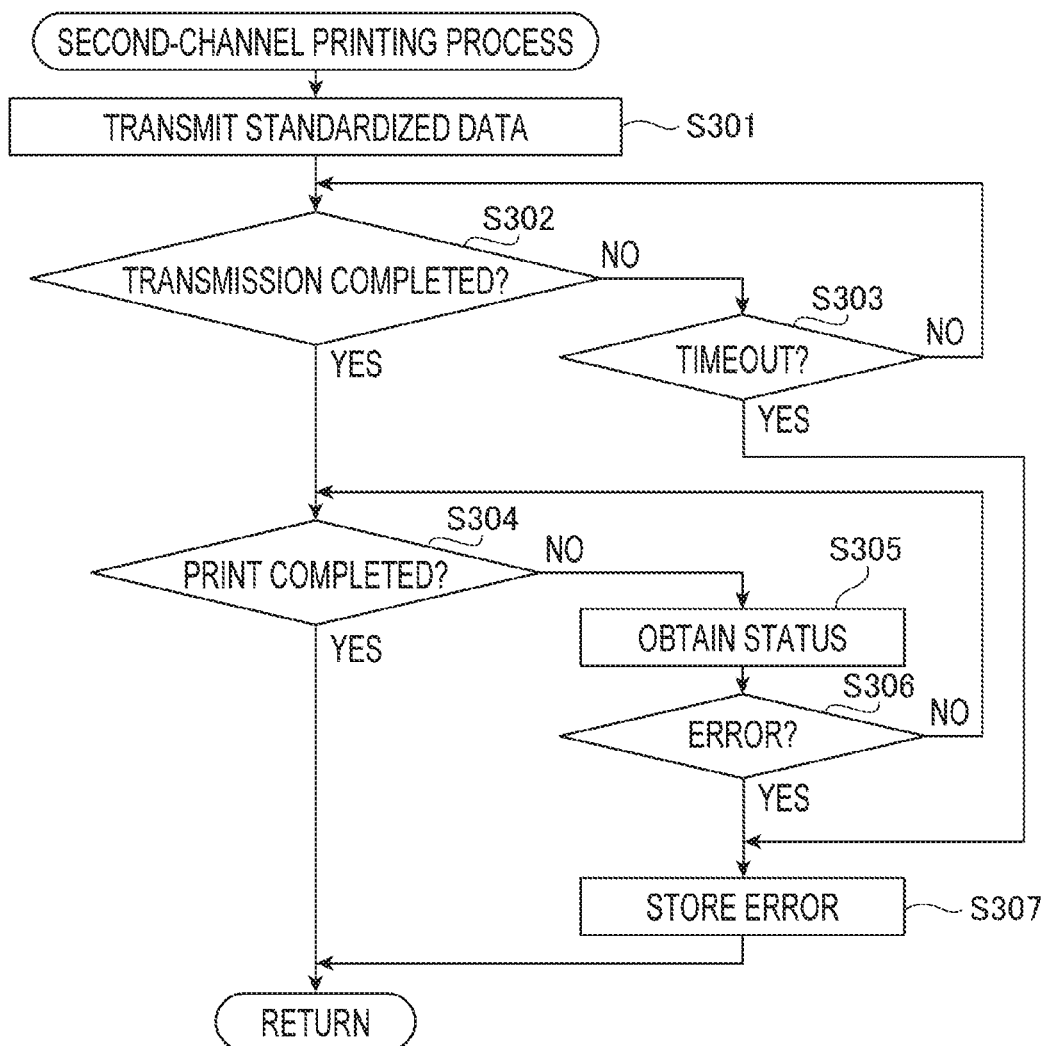
FIG. 8 is a flowchart to illustrate flows of steps in a second-channel printing process in the information processing apparatus according to the embodiment of the present disclosure.

Next, a flow of steps in a second-channel printing process will be described below with reference to FIG. 8. As the second-channel printing process starts, in S301, the CPU 21 transmits standardized data of the image data for the image to be printed to the printing apparatus 1. In S302, the CPU 21 determines whether transmission of the standardized data is completed.

In S302, if the CPU 21 determines that the transmission is not completed (S302: NO), in S303, the CPU 21 determines whether the communication with the printing apparatus 1 timed out. If the CPU 21 determines that the communication has not timed out (S303: NO), the CPU 21 returns to S302 and waits until the transmission of the standardized data is completed or the communication times out.

In S302, if the CPU 21 determines that transmission is completed (S302: YES), in S304, the CPU 21 determines whether the information processing apparatus 2 received responsive information indicating completion of the image printing from the printing apparatus 1. If the CPU 21 determines that the information processing apparatus 2 has not received the responsive information indicating completion of the image printing (S304: NO), in S305, the CPU 21 obtains status information of the printing apparatus 1 from the monitoring program 47.

Meanwhile, the printing apparatus 1 rasterizes the standardized data received from the information processing apparatus 1 and prints an image based on the rasterized data. The status information of the printing apparatus 1 may indicate an erroneous state in the printing apparatus 1 when an error occurs during the rasterization of the standardized data or while the image is being printed.

In S306, the CPU 21 determines whether the status information concerning the printing apparatus 1 indicates an error in the printing apparatus 1. If the CPU 21 determines that the information processing apparatus 2 has not received the responsive information indicating an error in the printing apparatus 1 (S306: NO), the CPU 21 returns to S304 and waits until either the responsive information indicating completion of the image printing or the responsive information indicating an error is received.

In S304, if the CPU 21 determines that the information processing apparatus 2 received the responsive information indicating completion of the image printing (S304: YES), the CPU 21 exits the second-channel printing process. The second-channel printing process conducts the printing control through the channel different from the first-channel printing process; therefore, the cause of the error in the first-channel printing process may not necessarily cause an error in the second-channel printing process, but the printing control may be completed. For example, a defect in the specialized print-controlling program 43 may cause a rasterization error during the rasterization by the specialized print-controlling program 43, but the image printing may be completed if the image data is rasterized by the basic rasterization in the printing apparatus 1. For another example, a data volume of the rasterized data generated by the specialized print-controlling program 43 may be too large and may cause a communication error. In such a case, the communication error may be overcome by transmitting the standardized data generated by the basic print-controlling program 45 to the printing apparatus 1 so that the image printing may be competed.

In S303, meanwhile, if the CPU 21 determines that the communication timed out while the standardized data is being transmitted (S303: YES), or in S306, if the CPU 21 determines that the information processing apparatus 2 has received the responsive information indicating an error in the printing apparatus 1 (S306: YES), in S307, the CPU 21 stores error occurrence information in the non-volatile memory 24. In particular, information indicating occurrence of the error is stored in the non-volatile memory 24 as the error occurrence information. The CPU 21 exits the first-channel printing process.

The flow returns to the printing process (see FIG. 5). Following the second-channel printing process in S110, in S111, the CPU 21 determines whether an error occurred in the second-channel printing process with reference to the error occurrence information. If the CPU 21 determines that an error occurred (S111: YES), or in S107, if the CPU 21 determines that the user does not permit the print setting to be altered (S107: NO), in S112, the CPU 21 controls the operation/display interface 26 to display a message to inform the user that the image printing ended incomplete. The CPU 21 ends the printing process thereat.

In S111, on the other hand, if the CPU 21 determines that no error occurred in the second-channel printing process but the image printing ended completely (S111: NO), in S113, the CPU 21 alters the priority channel to the second channel and ends the printing process thereat.

The CPU 21 may start the printing process once again after altering the priority channel to the second channel in S113 if a new print command is received through the image-generating application 41. As the printing process starts for another round, in S102, the CPU 21 determines that the first channel is not the priority channel (S102: NO), in S121, the CPU 21 obtains the error cause information stored in the non-volatile memory 24. The error cause information may have been stored since S213 (see FIG. 6) in response to the error occurred in the first-channel printing process in the previous round.

In S122, the CPU 21 determines based on the error cause information whether the error has been overcome. For example, if the error cause information indicates a rasterization error, and if the specialized print-controlling program 43 was updated after the rasterization error, the error by the same cause may not occur any longer. The CPU 21 may, for example, query a server that distributes the specialized print-controlling program 43 to the information processing apparatus 2 about updates of the specialized print-controlling program 43 in order to determine whether the specialized print-controlling program 43 has been updated.

For another example, if the error cause information indicates a communication error, and the controller 11 in the printing apparatus 1 has been updated, the error by the same cause may not occur any longer. For example, the controller 11 may have a defect in controlling the network interface 14 that causes the communication error. For another example, the error cause information may indicate a printer error, but if firmware in the printing apparatus 1 was updated after the printer error, or if the consumable items such as ink or a substrate in the printing apparatus 1 were refilled or exchanged, the error by the same cause may not occur any longer. The CPU 21 may query the printing apparatus 1 to determine whether the controller 11 has been updated, the firmware has been updated, or the consumable items were refilled or exchanged.

Therefore, in S122, if the CPU 21 determines that the error may have been overcome (S122: YES), in S123, the CPU 21 alters the priority channel to the first channel. In S124, the CPU 21 deletes the error cause information from the non-volatile memory 24 and proceeds to the first-channel printing process in S103. As the priority channel is restored to the first channel, in which the defect may be overcome, the user may operate the image printing in a more familiar operating condition.

In S122, on the other hand, if the CPU 21 determines that the error may not have been overcome (S122: NO), in S106, the CPU 21 determines whether the print settings should be altered. Optionally, the CPU 21 may determine whether the error may have been overcome when the application program to accept the print command is activated. If the CPU 21 determines that the error may have been overcome upon activation of the application program, the CPU 21 may alter the priority channel to the first channel.

Figure 9:
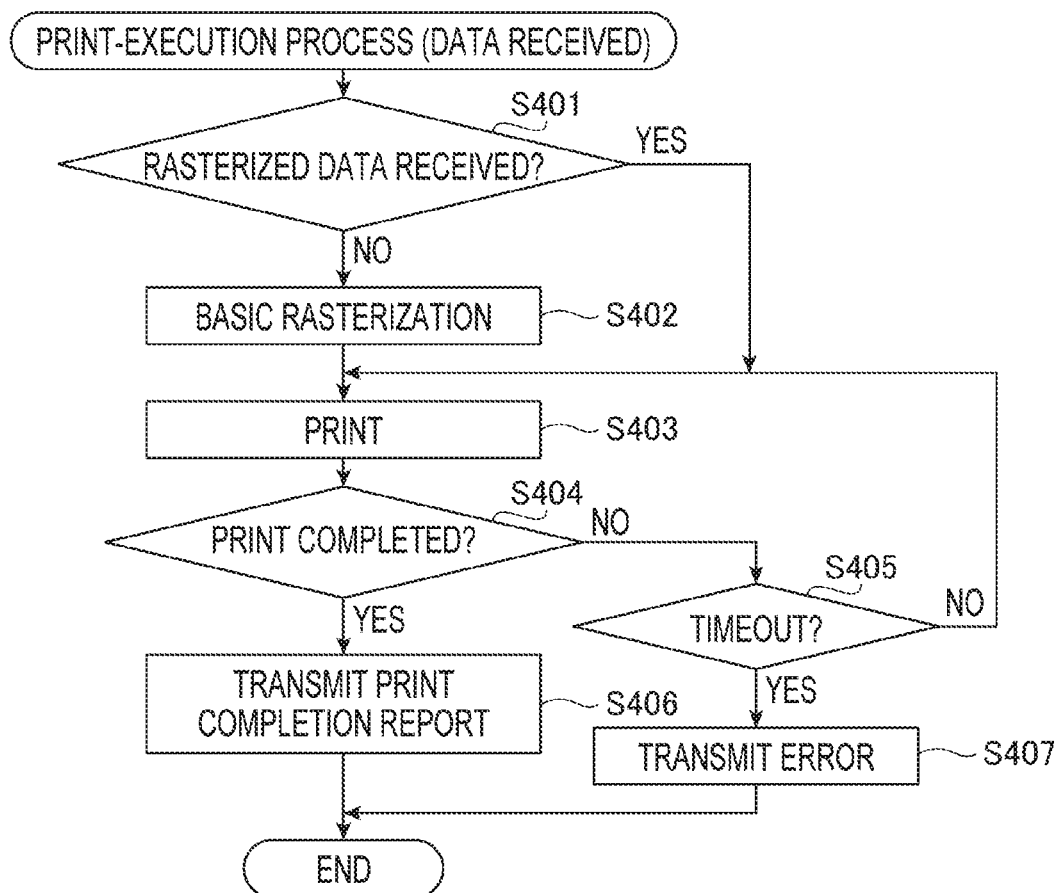
FIG. 9 is a flowchart to illustrate flows of steps in a print-execution process in the information processing apparatus according to the embodiment of the present disclosure.

Next, in the following paragraphs, with reference to FIG. 9, described will be a flow of steps in a print-execution process to be conducted by the printing apparatus 1 in order to interact with the information processing apparatus 2 and the user as described earlier. The print-execution process may be executed by the controller 11 in the printing apparatus 1 in response to receiving the data for printing from the information processing apparatus 2.

As the print-execution process starts, in S401, the controller 11 determines whether the received data is rasterized data. If the controller 11 determines that the received data is not rasterized data (S401: NO), in S402, the controller 11 applies basic rasterization to the received data. In particular, the printing apparatus 1 uses the basic rasterizing function installed in the printing apparatus 1 to generate the rasterized data if the received data is standardized data.

In S401, if the controller 11 determines that the received data is rasterized data (S401: YES), in S403, the controller 11 controls the image printer 12 to print an image based on either the received rasterized data or the rasterized data generated in S402. In S404, the controller 11 determines whether the image printing is completed. If the controller 11 determines that the image printing is not completed (S404: NO), in S405, the controller 11 determines whether the image printing timed out. If the controller 11 determines that the image printing has not timed out (S405: NO), the controller 11 returns to S403 and continues printing the image.

In S404, if the controller 11 determines that the image printing is completed (S404: YES), in S406, the controller 11 controls the network interface 14 to transmit information indicating completion of the image printing to the information processing apparatus 2 and ends the print-execution process thereat. In S405, on the other hand, if the controller 11 determines that the image printing timed out (S405: YES), in S407, the controller 11 controls the network interface 14 to transmit information indicating an error to the information processing apparatus 2 and ends the print-execution process thereat. Additionally, the controller 11 may transmit information indicating an error to the information processing apparatus 2 when, for example, the controller 11 fails to receive the data from the information processing apparatus 2 and when an error occurs in the basic rasterization of the standardized data.

As has been described above, according to the printing system 100 in the present embodiment, the printing apparatus 1 and the information processing apparatus 2 are connected to communicate wirelessly with each other so that an image based on the label image file in the information processing apparatus 2 may be printed by the printing apparatus 1. The printing system 100 has the first channel and the second channel, through which the image may be processed to be printed by the printing apparatus 1, and one of the first channel and the second channel selected as the priority channel may be used to print the image. If an error occurs during the image processing using the priority channel, the priority channel is switched to the other one of the first channel and the second channel to retry the image printing there-through. The priority channel may be switched and the image printing may be retried automatically so that the user may not be forced to manually overcome the error. While the image printing may be retried through the processing channel different from the former processing channel, in which the error occurred, the image printing may be successfully conducted as a result of the retry. Thus, the load on the user may be reduced, and the user may achieve the printed image without bearing the load.

Although an example of carrying out the invention has been described, those skilled in the art will appreciate that there are numerous variations and permutations of the printing system that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, the printing apparatus 1 may not necessarily be equipped with the operation panel 13. For another example, the memory medium in the information processing apparatus 2 may not necessarily be limited to the non-volatile memory 24 but may be any type of mass storage memory device.

For another example, the communication method between the printing apparatus 1 and the information processing apparatus 2 may not necessarily be limited to the wireless communication in compliance with the Wi-Fi standard but may be, for example, wired communication through a USB cable or wireless communication in compliance with Bluetooth (registered trademark). Further, the printing apparatus 1 and the information processing apparatus 2 may be adapted to a plurality of communication methods.

For another example, the image file for the image to be printed may not necessarily be limited to the label image file for printing a label on a tape. For example, the image file may be a compressed file including a PDF file, a JPEG file, etc., or may be a bitmap file. When the image file other than the label image file is used, an application program and a print-controlling program that may handle the image data equivalently to the image-generating application 41 and the specialized print-controlling program 43 may be adopted.

For another example, the second channel may not necessarily require rasterization in the printing apparatus 1; in other words, rasterization may be conducted in the information processing apparatus 2, as long as the second channel provides a processing channel different from the first channel. For example, if the basic print-controlling program 45 has the rasterizing function, the basic print-controlling program 45 may rasterize the image data by its own rasterizing function. In this configuration, the first channel and the second channel still differ in algorisms for the rasterization. In this configuration, further, while the first channel is a channel, which does not use the print-controlling function provided by the OS 44, and the second channel is a channel, which uses the print-controlling function provided by the OS 44.

For another example, the processing channels in the printing system 100 may not necessarily be limited to the first channel and the second channel, but the printing system 100 may have three or more channels. For example, the printing system 100 may have a channel, in which an image may be printed by a driver specialized to the device, and, a channel, in which an image may be printed by CUPS being a printer driver for UNIX (registered trademark), macOS (registered trademark), and Linux (registered trademark). The device-specific driver and CUPS are programs embedded in the OS 44 (see FIG. 2) in the information processing apparatus 2 to rasterize image data. With these additional processing channels, if errors occur in both the first channel and the second channel, the image printing may be retried through these additional processing channels.

For another example, when the image printing through the first channel fails, the priority channel may not necessarily be altered to the second channel only after when the image printing through the second channel succeeds. In other words, when the image printing through the first channel fails, the priority channel may be automatically switched to the second channel regardless of the failure or success of the image printing through the second channel.

For another example, the priority channel may initially be set to the second channel. In other words, the image printing through the second channel may be firstly attempted, and when the attempt through the second channel fails, the image printing may be retried through the first channel. For example, in order to overcome a rasterization error occurred in the printing apparatus 1, by switching the channels from the second channel to the first channel, the probability to obtain the printed image may be increased.

For another example, an error may occur during the image printing through the priority channel regardless of the function of the processing channel being used. In such a case, the image printing may not necessarily be retried. For example, the printing apparatus 1 may be incapable of printing the image due to shortage of the consumable items such as sheets or ink. In such a case, the error may not be overcome by switching the processing channels. Therefore, if an error occurs in S104 in the printing process (see FIG. 5), the CPU 21 may further determine whether the error cause is a printer error. If the error cause is a printer error, the flow may proceed to S112.

For another example, the steps or the processes in the printing process described above may be accomplished by a single CPU, a plurality of CPUs, a hardware device such as an ASIC, or a combination of any of these. For another example, the steps or the processes in the above-described embodiment may be accomplished by various media or methods, including a recording medium storing the programs to implement the steps or the processes.

What is claimed is:

1. A non-transitory computer readable storage medium storing computer readable instructions that are executable by a computer in an information processing apparatus, the information processing apparatus comprising a communication interface, through which the information processing apparatus is connected with a printer, the information processing apparatus comprising a first channel and a second channel being processing channels configured to cause the printer to print an image based on image data, wherein the first channel is a channel to process the image data for the image to be printed by executing a specialized print-controlling program; and wherein the second channel is a channel to process the image data for the image to be printed by executing a print controlling program provided in an operating system of the information processing apparatus without executing the specialized print-controlling program, the computer readable instructions, when executed by the computer, causing the computer to:

in response to receiving a print command, conduct a first printing control to cause the printer to print the image through the first channel;

determine whether image printing to print the image by the printer under the first printing control failed; and based on a determination that the image printing under the first printing control failed, conduct a second printing control to cause the printer to retry the image printing based on the image data through the second channel.

2. The non-transitory computer readable storage medium according to claim 1,
wherein the specialized print-controlling program is configured to rasterize the image data through a specialized rasterization process.

3. The non-transitory computer readable storage medium according to claim 1,
wherein, based on the determination that the image printing under the first printing control failed, and in a case where a print setting in the printer to print the image under the first print control includes a setting infeasible to the second channel, the computer readable instructions cause the computer to alter the setting to another setting feasible to the second channel prior to causing the printer to retry the image printing through the second channel.

4. The non-transitory computer readable storage medium according to claim 1,
wherein, in a case where an imaging process to process the image data during the first printing control fails, the computer determines that the image printing under the first printing control failed.

5. The non-transitory computer readable storage medium according to claim 1,
wherein, in a case where communication between the information processing apparatus and the printer times out during the first printing control, the computer determines that the image printing under the first printing control failed.

6. The non-transitory computer readable storage medium according to claim 1,
wherein the computer readable instructions cause the information processing apparatus to:
in a case where the first channel is selected as a channel to be prioritized, and based on the determination that the image printing under the first printing control failed, alter the channel to be prioritized to the second channel;
determine whether a cause of failure in the image printing under the first printing control has been overcome; and
based on a determination that the cause of the failure in the image printing under the first printing control has been overcome, alter the channel to be prioritized to the first channel.

7. A printing system comprising an information processing apparatus and a printer, the information processing apparatus and the printer being configured to communicate with each other in conformity with a predetermined communication protocol, the printing system comprising processing channels configured to cause the printer to print an image based on image data, the processing channels including:
a first channel configured to cause the information processing apparatus to process the image data for the image to be printed by executing a specialized print-controlling program; and
a second channel configured to cause the information processing apparatus to process the image data for the image to be printed by executing a print controlling program provided in an operating system of the information processing apparatus without executing the specialized print-controlling program,
wherein the information processing apparatus is configured to:
in response to receiving a print command, conduct a first printing control to cause the printer to print the image through the first channel;
determine whether image printing to print the image by the printer under the first printing control failed; and
based on a determination that the image printing under the first printing control failed, conduct a second printing control to cause the printer to retry the image printing based on the image data through the second channel.

8. The printing system according to claim 7,
wherein the specialized print-controlling program is configured to rasterize the image data through a specialized rasterization process.

* * * * *